B. G. LAMME.
SYSTEM OF ELECTRICAL SHIP PROPULSION.
APPLICATION FILED JUNE 29, 1918.
1,390,624. Patented Sept. 13, 1921.
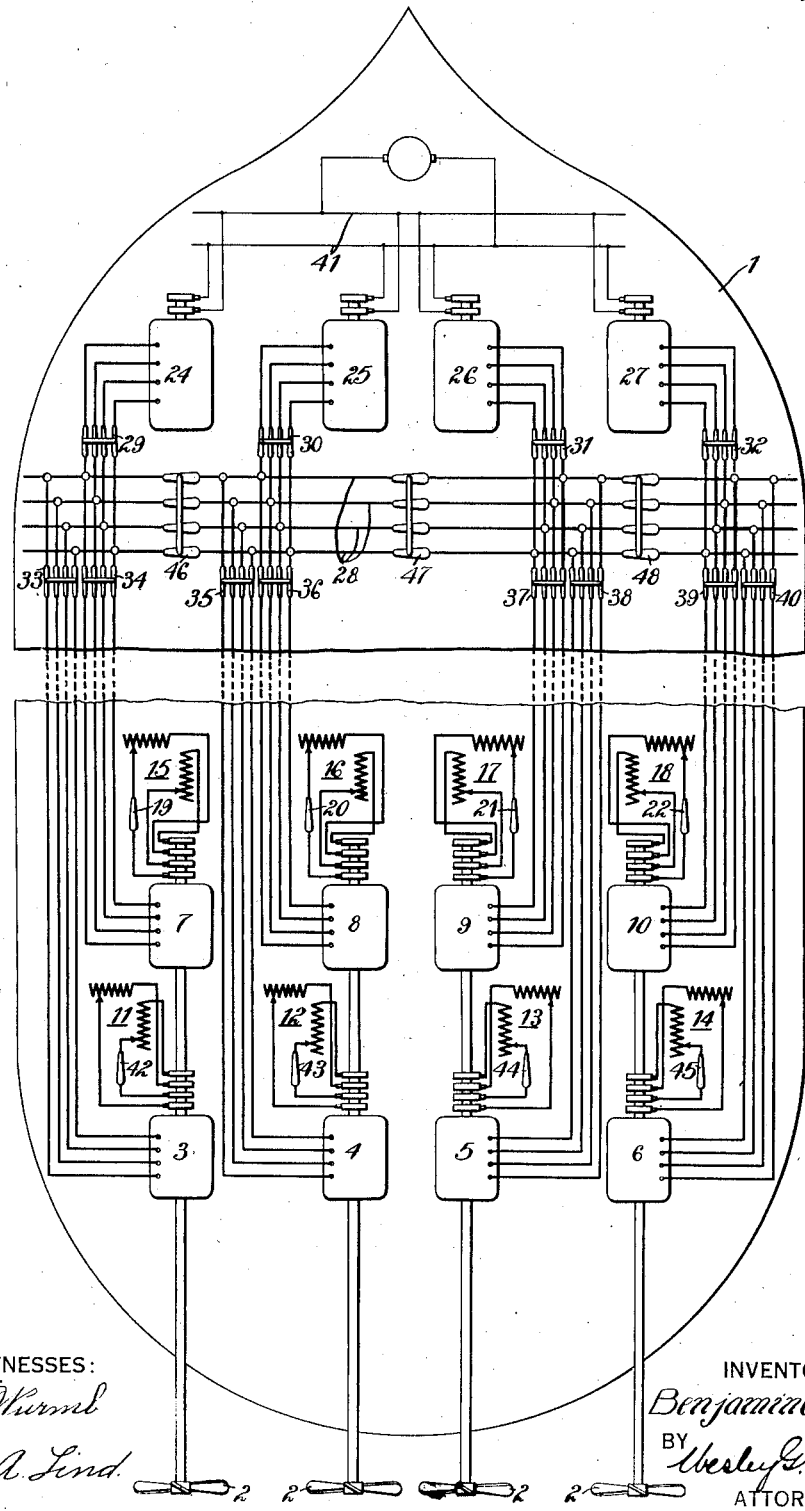

UNITED STATES PATENT OFFICE.

BENJAMIN G. LAMME, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL SHIP PROPULSION.

1,390,624.     Specification of Letters Patent.    Patented Sept. 13, 1921.

Application filed June 29, 1918. Serial No. 242,621.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Systems of Electrical Ship Propulsion, of which the following is a specification.

My invention relates to systems of electrical ship propulsion, and it has for its object to provide a system of the character designated which shall be extremely flexible in adjustment and in arrangement, said system being further adapted for highly efficient operation throughout wide variations in speed.

The single figure of the accompanying drawing is a diagrammatic sectional plan view of a ship's hull provided with an electrical propulsion system embodying a preferred form of my invention.

Systems of electrical propulsion for ships are coming into general use at the present time. A prime mover drives a generator which, in turn, energizes a motor or motors coupled to the propeller shaft. Systems of this character have desirable structural and operating characteristics, as the prime mover and the generator may be mounted in the most desirable positions, without regard to the location of the propeller shaft, and the speed of the ship may be readily controlled by the alteration of the electrical connections between the generator and the motor.

It is desirable, with certain classes of ships, particular war vessels, that an extremely high battle-speed be provided, such, for example, as thirty knots per hour, but that a cruising speed of, for example, fourteen knots per hour be also provided for ordinary use. It is further desirable that the operation of the active prime movers be efficient at both of said speeds. It is well known that the resistance to a ship's movement increases substantially as the square of the speed, over intermediate portions of the speed range, and substantially as the cube of the speed over the upper portion of the speed range. It is, therefore, necessary to provide many times as much driving energy at the battle speed as is required at cruising speed.

In accordance with the present invention, I preferably provide each propeller shaft with two or more driving motors and I arrange to energize said motors from a plurality of prime movers, through suitable generators. The motors are preferably of the induction type and are arranged for polyphase operation, both in the primary and the secondary members. At least one motor on each propeller shaft is further adapted for single-phase operation in the secondary member, it being well known that an ordinary polyphase induction motor, when supplied with alternating current of a given frequency, tends to operate at substantially one-half the speed when the secondary member is arranged for single-phase operation that it does when the secondary member is arranged for polyphase operation.

At a high speed, such, for example, as battle speed, all the generators are employed to drive all the motors, with the secondary members arranged for polyphase operation, thus developing a maximum of power and of ship speed. For a lower speed, such, for example, as cruising speed, it is necessary to operate but a small portion of the generating capacity such, for example, as a single generator, and this machine is connected to energize the motors on each propeller shaft which are respectively arranged for single-phase secondary operation. By this means, ample power is developed for the particular speed requirements in question and, furthermore, the single active generator is operating and may be driven at practically the same speed as under battle-speed conditions, thus operating at high efficiency. The fact that the motors are connected for single-phase secondary operation instead of polyphase secondary operation causes them to operate the propellers at a much lower speed than under battle-speed conditions. When operating with single-phase secondary members, the propulsion members have a lower power-factor than when operating with polyphase secondary members but this circumstance produces no serious results, as the load is generally so small that no excessive heating of the machines or of the connections therebetween is produced by reason of wattless currents.

In a preferred type of low-speed operation, two or more motors are coupled to the same propeller shaft and are operated with single-phase secondary members, the active secondary phase-divisions being mutually electrically displaced, whereby the pulsating torques of the two induction motors, inherently attendant upon single-phase operation, are dephased. By this specific connection, the resultant torque imparted to the propeller shaft may be rendered substantially uniform and the excessive vibration attendant upon using the motors in single-phase operation is obviated.

Referring to the drawing for a more detailed understanding of my invention, the hull of a ship is shown in outline at 1. The ship is provided with four propellers 2—2 and each of the four propeller shafts is provided with two propulsion motors of the induction type, said motors being numbered 3 to 10, inclusive. Each of the motors is provided with a wound secondary member shown as of the quarter or two-phase type and the secondary windings are connected to adjustable resistors 11 to 18, inclusive, respectively, for speed adjustment. A disconnecting switch of any suitable form is placed in one lead of each of the resistors 15 to 18, inclusive, these switches being designated 19 to 22, respectively. Similar disconnecting switches 42 to 45, inclusive, are placed in one lead of each of the resistors 11 to 14, inclusive, for a like function, but particular attention is directed to the fact that the switch 19 is shown inserted in one phase of the motor 7, whereas the switch 42 is shown inserted in the other phase of the motor 3, bearing in mind that the relative space-phase relation between the rotor members of the respective motors is fixed by virtue of the rigid connection therebetween.

Energy for the operation of the motors 3 to 10, inclusive, may be derived from suitable polyphase generators 24, 25, 26 and 27, these generators being shown connected to polyphase main buses 28 through disconnecting switches 29, 30, 31 and 32. The buses may be sectionalized by suitable switches 46, 47 and 48.

The primary members of the propulsion motors are respectively connected to derive energy from the buses 28 through switches 33 to 40, inclusive. Excitation for the generators 24 to 27, inclusive, is derived from a direct-current bus 41.

Having thus described the arrangement of a system embodying my invention, the operation is as follows. At maximum speeds, such as are used in battle practice, the generators and the motors are all energized, the switches 29 to 41, inclusive, all being closed and the resistors 11 to 18, inclusive, being reduced to minimum effective values. The switches 46, 47 and 48 are preferably opened, so that each generator supplies current only to its corresponding pair of motors. Control of the speed may be effected by altering the speed of the prime movers, thus changing the frequency of the current supplied to the propulsion motors.

In order to obtain an efficient intermediate speed, a portion of the generators is cut out and, furthermore four of the motors such, for example, as 3, 4, 5 and 6 are disconnected by opening the switches 33, 35, 38 and 40, the remaining propulsion motors continuing to operate with polyphase secondary members. The switches 46, 47 and 48 are closed so that all the desired motors may be energized from a common source, as one or two generators.

For the low or cruising speed the power requirements are so small that it is necessary to operate, in general, but a single generator. The connections are maintained to the primary windings of all the motors, as before, but the respective secondary switches are opened so that all the motors are connected for single-phase secondary operation. This, for a given supply frequency, produces a speed substantially one-half of that obtained with polyphase secondary operation at the same supply frequency. The fact that the active secondary phase division of the motor 7 is electrically displaced from the active secondary phase division of the motor 3 causes the periods of maximum torque in the two motors to alternate in such manner that the resultant total torque imparted to the propeller shaft is substantially uniform, thus reducing jar and vibration to a minimum.

If the motors are specially designed or, if the operating conditions are such that the vibration produces no unpleasant consequence, but one motor need be operated on each propeller shaft, this motor having a single-phase secondary member but, for ordinary commercial practice, the attendant vibration renders this specific connection undesirable.

With the usual ratio obtaining between cruising and battle speeds, the available energy of a single generator is ample to energize all the motors in operation, even when the heating effect of the large amount of wattless current flowing, because of the low power-factor of the single-phase secondary induction motor, is taken into consideration.

Although I have described my invention only in connection with ship propulsion, I contemplate its utilization in other installations where a plurality of induction motors are jointly adjusted in speed.

While I have shown my invention in its preferred form, it will be obvious to those skilled in the art that it is susceptible of various minor changes and alterations without departing from the spirit thereof and I desire, therefore, that only such restrictions shall be placed thereupon as are imposed

I claim as my invention:

1. A motor aggregate comprising a plurality of induction motors having their rotor members rigidly coupled together, each of said motors having a polyphase primary member and a single-phase secondary member, and means for cophasially energizing the primary windings of said motors, said coupling being such that the torque impulses in said secondary members are non-coincident.

2. A motor aggregate comprising a plurality of induction motors having their rotor members rigidly coupled together, each of said motors having a polyphase primary member and a single-phase secondary member, and means for co-phasially energizing the primary windings of said motors, said coupling being such that the torque impulses in said secondary members are evenly distributed in time-phase with respect to each other.

3. A multi-speed motor aggregate comprising a plurality of induction motors provided with polyphase primary and secondary windings, respectively, and having their rotors rigidly coupled together, means for cophasially energizing the primary windings of said motors, whereby operation with polyphase secondary members is secured, and means for opening all but one phase-division in the secondary winding of each of said motors, respectively, the remaining phase-divisions being so chosen that their periods of maximum torque are mutually displaced, whereby operation of the aggregate at radically lower speed is secured and substantially uniform torque is developed by the aggregate.

4. A multi-speed motor aggregate comprising a plurality of induction motors provided with polyphase primary and secondary windings, respectively, and having their rotors rigidly coupled together, means for cophasially energizing the primary windings of said motors, whereby operation with polyphase secondary members is secured, and means for opening all but one phase division in the secondary winding of each of said motors, respectively, the remaining phase-divisions being so chosen that their periods of maximum torque are evenly distributed in mutual time-phase, whereby operation of the aggregate at radically lower speed is secured and substantially uniform torque is developed by the aggregate.

5. The combination of a plurality of polyphase induction motors having primary and secondary windings, means for rigidly interconnecting the rotors of said motors, and means for opening certain phase-divisions of each secondary member such that the remaining phase-divisions of said secondary windings are in relative electrical displacement.

6. In a system of ship propulsion, the combination with a plurality of induction motors mounted on a common shaft, said motors having polyphase primary and secondary windings, of means for opening all but one phase-division of each secondary winding, the remaining phase-divisions being mutually electrically displaced, whereby the torque impulses delivered to said shaft by said motors are in relative time-displacement.

7. A system of control comprising a plurality of induction motors having polyphase primary and secondary windings, respectively, and having their rotors rigidly coupled together, means for operating said motors with polyphase secondary connections to produce a speed near synchronism, and means for operating said motors with single-phase secondary connections to produce a materially lower speed, the phase relations of the single-phase secondary connections being selectively displaced to maintain a substantially uniform collective distribution of torque by said rotors.

In testimony whereof, I have hereunto subscribed my name this 27th day of June, 1918.

BENJ. G. LAMME.